(12) United States Patent
Warren et al.

(10) Patent No.: US 7,730,460 B1
(45) Date of Patent: Jun. 1, 2010

(54) CODE EXECUTION VISUALIZATION USING SOFTWARE FINGERPRINTING

(75) Inventors: Christina E. Warren, San Jose, CA (US); Sanjay K. Patel, Cupertino, CA (US); Nathan Slingerland, Capitola, CA (US)

(73) Assignee: Apple Inc., Cupertino, CA (US)

( * ) Notice: Subject to any disclaimer, the term of this patent is extended or adjusted under 35 U.S.C. 154(b) by 1098 days.

(21) Appl. No.: 10/871,487

(22) Filed: Jun. 18, 2004

(51) Int. Cl.
*G06F 9/44* (2006.01)
(52) U.S. Cl. .................................. 717/133; 717/130
(58) Field of Classification Search .................. 717/124
See application file for complete search history.

(56) References Cited

U.S. PATENT DOCUMENTS

| | | | | |
|---|---|---|---|---|
| 5,812,850 A | * | 9/1998 | Wimble | 717/131 |
| 6,332,212 B1 | * | 12/2001 | Organ et al. | 717/128 |
| 6,751,789 B1 | * | 6/2004 | Berry et al. | 717/130 |
| 6,857,120 B1 | * | 2/2005 | Arnold et al. | 717/157 |
| 7,389,497 B1 | * | 6/2008 | Edmark et al. | 717/130 |
| 2004/0148594 A1 | * | 7/2004 | Williams | 717/158 |

OTHER PUBLICATIONS

"Development Tools," copyright 2002 Apple Computer, Inc. [online], [retrieved on Sep. 10, 2004] Retrieved from Archived web pages of Apple Computer, Inc. <URL: http://web.archive.org/web/20030201221325/developer.apple.com/tools/debuggers.html>.
"Developer Tools Overview," [online], [retrieved on Sep. 10, 2004] Retrieved from archived web pages of Apple Computer, Inc. <URL: http://web.archive.org/web/20010320224849/developer.apple.com/techpubs/macosx/DeveloperTools/DevToolsOverview.html>.
"MONster User Guide," Architecture and Performance Group, Apple Computer, Inc., Oct. 2002.
"Shikari 2.5 User Guide," Architecture and Performance Group, Apple Computer, Inc., Oct. 2002.
"Sampler," Development Tools Help Menu, Dec. 2002, Apple Computer, Inc.
"Sample Command Man Page," Development Tools Help Menu, Dec. 2002, Apple Computer, Inc.
"MallocDebug Help," Development Tools Help Menu, Dec. 2002, Apple Computer, Inc.
"MallocDebug Release Notes," Development Tools Help Menu, Dec. 2002, Apple Computer, Inc.
"Helpful Hints on using MallocDebug," Development Tools Help Menu, Dec. 2002, Apple Computer, Inc.
"Thread Viewer Help," Development Tools Help Menu, Dec. 2002, Apple Computer, Inc.
"ObjectAlloc Help," Development Tools Help Menu, Dec. 2002, Apple Computer, Inc.

* cited by examiner

*Primary Examiner*—Tuan Q Dam
*Assistant Examiner*—Isaac T Tecklu
(74) *Attorney, Agent, or Firm*—Wong, Cabello, Lutsch, Rutherford & Brucculeri LLP

(57) ABSTRACT

A system, method, and computer program for analyzing code execution and software performance characteristics are disclosed. Samples of executing code may be taken based on any of a number of various triggers. For example, samples may be triggered based on function calls, such as malloc calls. Alternatively, samples may be triggered based on occurrence of a specified event. Code execution is graphically displayed such that certain patterns may be easily identified. Multiple redundant function calls and areas of code having excessively deep function calls can be readily spotted. Such areas represent opportunities for performance optimization.

39 Claims, 14 Drawing Sheets

FIG. 4

| Source File: | (inf%) SKTGraphicView.m | | Function: | |
|---|---|---|---|---|
| Self | Total | Line | Code | |
| | | 782 | | |
| | | 783 | [[self undoManager] setActionName:NSLocalizedStringFromTable(@ "Set Fill Color", | |
| | | 784 | } | |
| | | 785 | } | |
| | | 786 | | |
| | | 787 | - (IBAction)selectAll:(id)sender { | |
| | | 788 | NSArray *graphics = [[self drawDocument] graphics]; | |
| | 100.0% | 789 | [self performSelector:@selector(selectGraphic:) withEachObjectInArray:graphics]; | |
| | | 790 | } | |
| | | 791 | | |
| | | 792 | - (IBAction)deselectAll:(id)sender { | |
| | | 793 | [self clearSelection]; | |
| | | 794 | } | |
| | | 795 | | |
| | | 796 | - (IBAction)delete:(id)sender { | |
| | | 797 | NSArray *selCopy=[[NSArray allocWithZone:[self zone]] initWithArray:[self selecte | |
| | | 798 | if ([selCopy count] > 0) { | |
| | | 799 | [self drawDocument] performSelector:@selector(removeGraphic:) withEachObjectIr | |

0 of 0 samples in self (nan%), 0 of 972 samples total (0.0%), 1 of 1293 lines (0.1%) selected 0xd640    0xd6c8                                    CPU Model: 7450

CODE EXECUTION VISUALIZATION USING SOFTWARE FINGERPRINTING

BACKGROUND OF THE INVENTION

1. Field of the Invention

The present invention relates generally to analyzing software performance, and more particularly, to a system, method, and program for graphically presenting code execution data in order to quickly identify of areas of code which may represent opportunities for optimization.

2. Related Art

Performance is an important aspect of software design. If an application does not perform well, users will not likely want to use that application. Performance is a subjective term referring to the general way in which something operates. Performance may include how efficiently system resources (e.g., CPU, memory, and hard disk drive) are used. There are aspects of performance, including but not limited to speed, memory footprint, memory turnover, memory usage, filesystem usage, etc., that can be measured. Improving on these measurements increases the efficiency of the software.

Software programs can have poor performance due to any of a number of different problems. The reason for poor performance of a particular software program is not always apparent. In particular, large-scale software can be extremely complex, with multiple layers and many modules, such that implementation details (those causing performance problems) are often hidden across the layers and modules.

In connection with analyzing software performance, software programs can be "sampled" at runtime. The samples may provide a statistical representation of how much CPU time is spent in each function. Samples may be taken continuously, for example, during execution of a program, from a specified start time to a specified end time. Samples may also be taken periodically, for example, at specified time intervals (time-based sampling). When a sample is taken, the program's stack backtrace and other information can be recorded, and entered into a "trace table." A trace table may have many thousands of such entries, depending on how many samples were taken. Analyzing sizeable trace tables for complex software programs can be very difficult and time-consuming.

SUMMARY OF THE INVENTION

In analyzing software performance, the impact of an operation on performance may be considered as a function of cost(operation)*use(operation). Traditional performance tools concentrate more on cost than on use. While prior art tools provide information about where time is being spent and how often functions are called, they do not provide any indication of how the function was called during program execution. To better understand a program's behavior so as to provide insight into how a program may be optimized, use-based tracing would be desirable.

A need therefore exists for a system, method, and tool for analyzing software performance characteristics that overcomes the limitations of the prior art. The present invention improves upon the prior art by presenting code execution information in such a way that conveys information pertaining to function usage. The present invention provides for the visual display of code execution data such that repetitive patterns and excessively deep function calls can be readily identified as areas in need of improvement (i.e., areas having suspect performance). Thus, the present invention allows for quick and efficient analysis of code execution by quickly finding areas of code that can be improved in order to optimize software performance.

In accordance with certain embodiments of the present invention, a system, method, and program for analyzing code execution are provided, wherein a number of samples are taken of the code during run-time. For each sample, the program's stack backtrace and other information can be recorded. In accordance with the present invention, sampling is not limited to time-based sampling. Samples may also be taken based on the occurrence of a specified function call (function call sampling). For example, samples may be taken based on the occurrence of a memory allocation call (memory allocation sampling). Samples may also be taken based on a specified hardware or operating system ("OS") event such as a crash, page fault, cache miss, instruction stall, or other event of interest (event sampling). A system trace may also be performed in order to understand scheduling behavior. A Java trace may also be performed in order to provide time/allocation tracing in Java. In time-based profiling, each sample may be displayed graphically as a plot of callstack depth versus time. For event-based sampling, each sample may be displayed as a plot of callstack depth versus event number. For malloc-based (i.e., memory-allocation-based) or other function-call-sampling or event-based sampling, each sample may be displayed as a plot of callstack depth versus sample number.

By graphically displaying code execution chronologically, certain patterns in the code execution paths may be quickly and easily identified. Such patterns represent specific call patterns through the code. For example, repeated patterns in a graph in accordance with the invention indicates loops that walk through the same functions. Once recognized as an area in need of improvement, such areas may be optimized by, for example, removing invariant calculations from within a loop. Furthermore, areas of code having excessively deep function calls be readily spotted. Such areas generally represent inefficient call sequences which can likely be improved to optimize performance. Oftentimes, dramatic performance gains may be achieved by optimizing only a small number of key functions which are responsible for the vast majority of CPU time used by a program.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4 depicts an exemplary code browser screen.

DETAILED DESCRIPTION OF THE INVENTION

When processes are running on a computer system, the processes and the system CPU and memory can be "sampled" at runtime. Samples may be taken continuously, for example, during a particular time period while the software is running. Samples may also be taken periodically, for example, at specified time intervals (time-based sampling). Programs can also be sampled when various events occur at runtime. The samples provide a statistical representation of how much CPU time is spent in each function. Samples may be taken, for example, based on a specified function call (function call sampling), memory allocation calls (memory allocation sampling), or on a specified hardware or OS event such as an application crash, page fault, cache miss, instruction stall, or other event of interest (event sampling). Various other sampling configurations may provide interesting termination events.

When a sampling run is complete, the trace table can be analyzed to build a single ("top-down") function call tree, showing the full tree of all function calls that were made, from the application's main entry point to the lowest leaf function. Top-down function call trees can be navigated to see the pattern of function calls in the application, to see overall how resources were used by the application.

Figure 1:
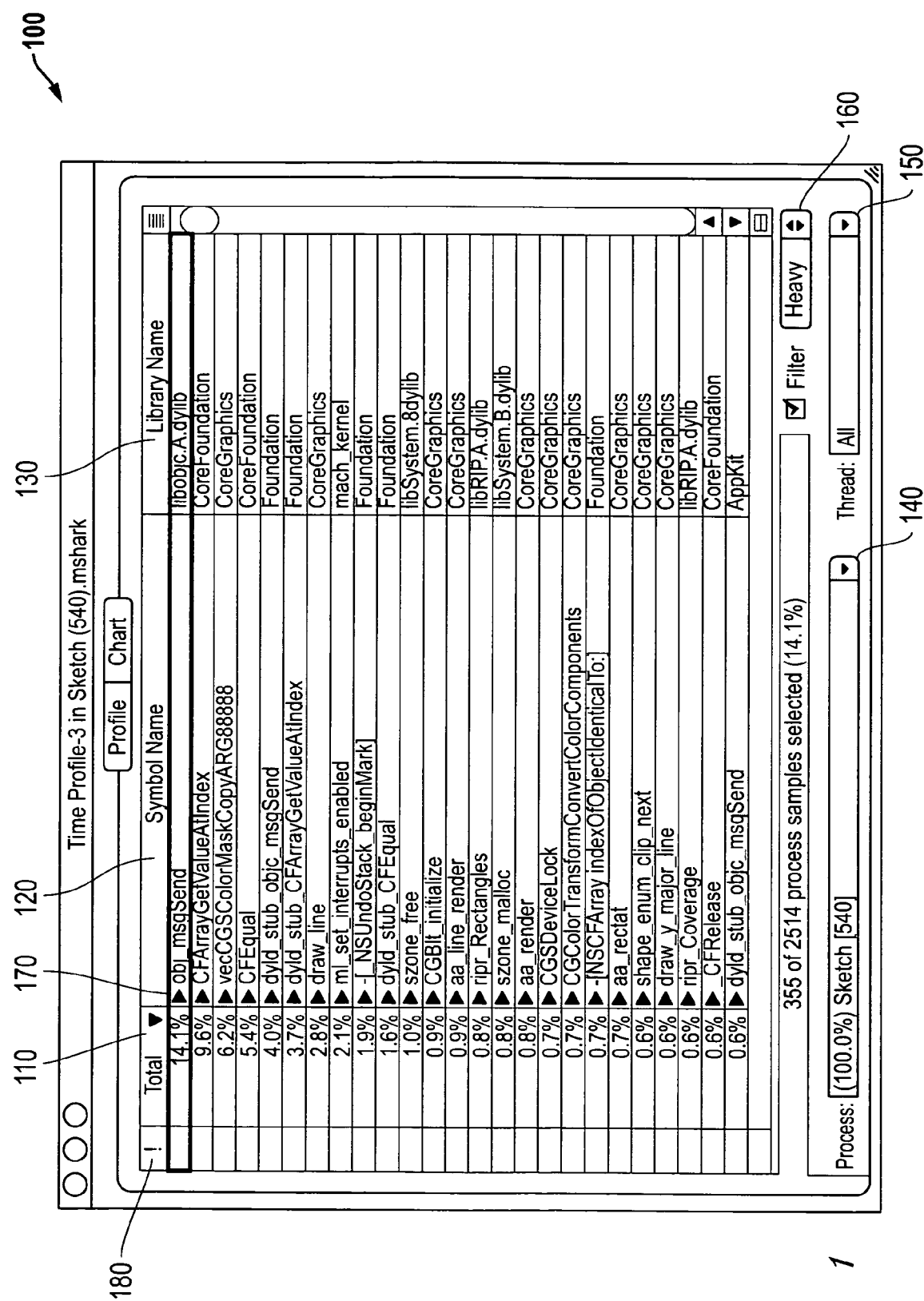
FIG. 1 depicts an exemplary sample time-based profile.

Reference is now made to FIG. 1, which depicts an exemplary profile 100 which outlines or lists various sampled functions. The profile 100 represents a tabular summary of the total time spent in each function (Total 110, which is expressed in this example as a percentage), the function name (also referred to as the Symbol Name 120), and the name of the library to which the function belongs (Library Name 130). Instead of expressing the time as a percentage, the table may show the length of time spent in each function or the number of samples in which each function was fou. In this illustrative example, the sampling was based on a time interval; however, as will be discussed further below, other types of sampling techniques may be used.

The scope of the displayed samples can be system wide. Alternatively, the scope of the displayed samples can be limited to a particular process. A process selection menu 140 may be provided which lists the sampled processes. The processes may be listed in order of descending weight in the profile. Each entry in the menu may include without limitation the following information: percent of total samples, process name, and process ID (PID). By default, the samples from all of the threads within the selected process may be merged.

In addition, the scope of the displayed samples can be limited to a specific thread. A thread selection menu 150 may be provided which lists the various threads.

A profile view matrix 160 may be set to "heavy" view or "tree" view. The tree view represents the top-down call tree from the application's main entry point (or from a focused function if focusing is enabled) to the lowest leaf function. The tree view provides an overall picture of the program calling structure. The heavy view represents the bottom-up call tree of all ways that the leaf function call was reached. In the heavy view which is illustrated in FIG. 1 each symbol name has a disclosure triangle 170 next to it, which may be closed by default. The disclosure triangle 170 hides or shows information related to the label of the triangle. Selecting the triangle expands or collapses the information (e.g., information pertaining to ancestor functions) it contains.

By default, the functions may be sorted in descending order of the Total 110. In the example shown in FIG. 1, 14.1% of the samples were found in the function "objc_msgSend." A flag (e.g., "!") may be set in column 180 for a particular function to indicate detection of a significant amount of time or other cost spent in that function and that further analysis may be warranted. In addition, a comment or warning may appear in a callout which provides code tuning advice and tips for correcting non-optimal code patterns.

For example, advice may be provided in a popup or callout suggesting alternative ways to achieve the desired functionality more quickly. The discovery of loop boundaries may also be indicated. A suggestion may also be provided to remove invariant instructions (a loop invariant operation is one that does not change within the loop.) A suggestion may also be provided to unroll loops (i.e., adjust loop boundary conditions and perform several loop iterations of work within the adjusted loop). Various floating-point optimization tips may also be provided. Suggestions may also be provided to use instructions that control cache behavior or state. Advice may also be offered with respect to alignment of code in memory. Suggestions may also be made with respect to improving performance specific to a certain CPU model.

Figure 2:
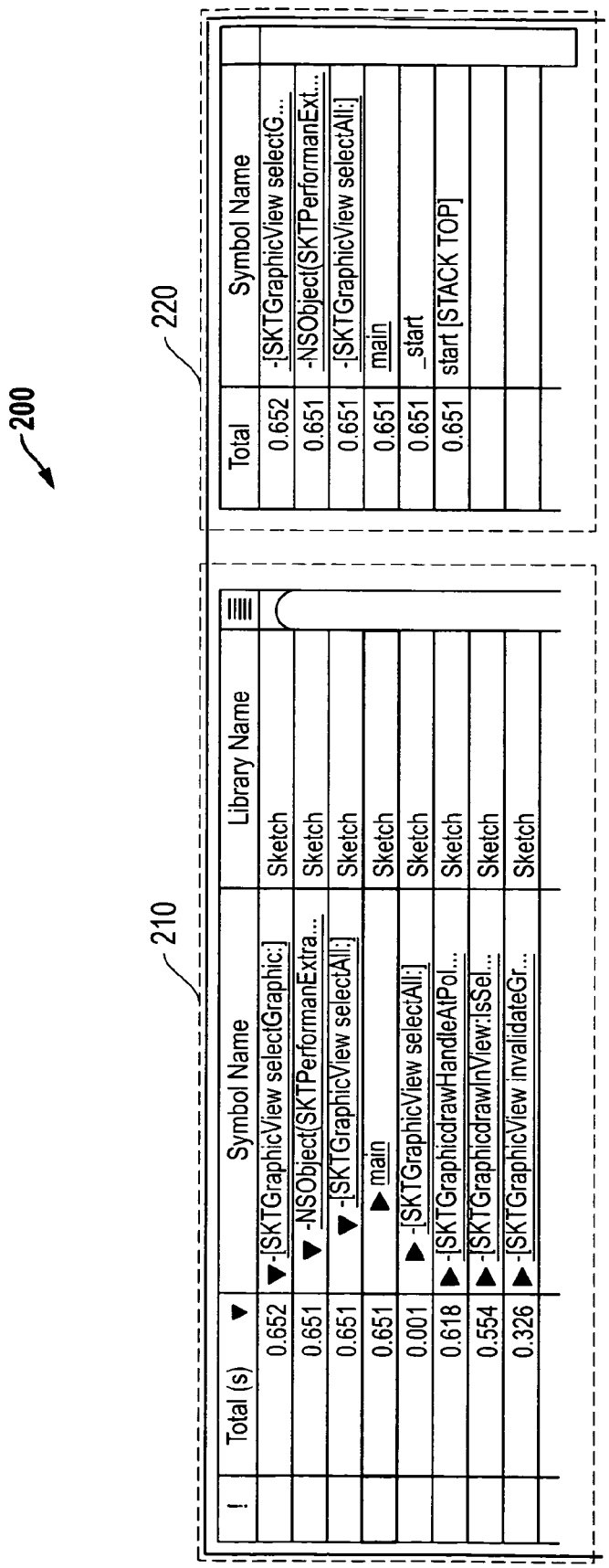
FIG. 2 depicts a portion of an exemplary callstack table (heavy view).

FIG. 2 depicts a portion of a screenshot of an exemplary callstack table 200 comprising representations of a heavy view of a call tree 210 and a callstack pane 220. The heavy view shows the various leaf functions and how they were called. Thus, the heavy view allows a determination to be made of which functions are the most performance critical, and to see the calling paths to those functions. Sorting the leaf functions from most expensive to least expensive can make expensive leaf functions much more apparent, with context information showing how they were called.

If a function is selected in the heavy view, the callstack pane 220 will show the stack leading up to the selected function. If a function is selected in the callstack pane 220, the heavy view 210 will automatically expand the outline to show that function. For example, if the function "main" is selected in the call tree 210, the callstack 220 may show the stack leading up to main.

Figure 3:
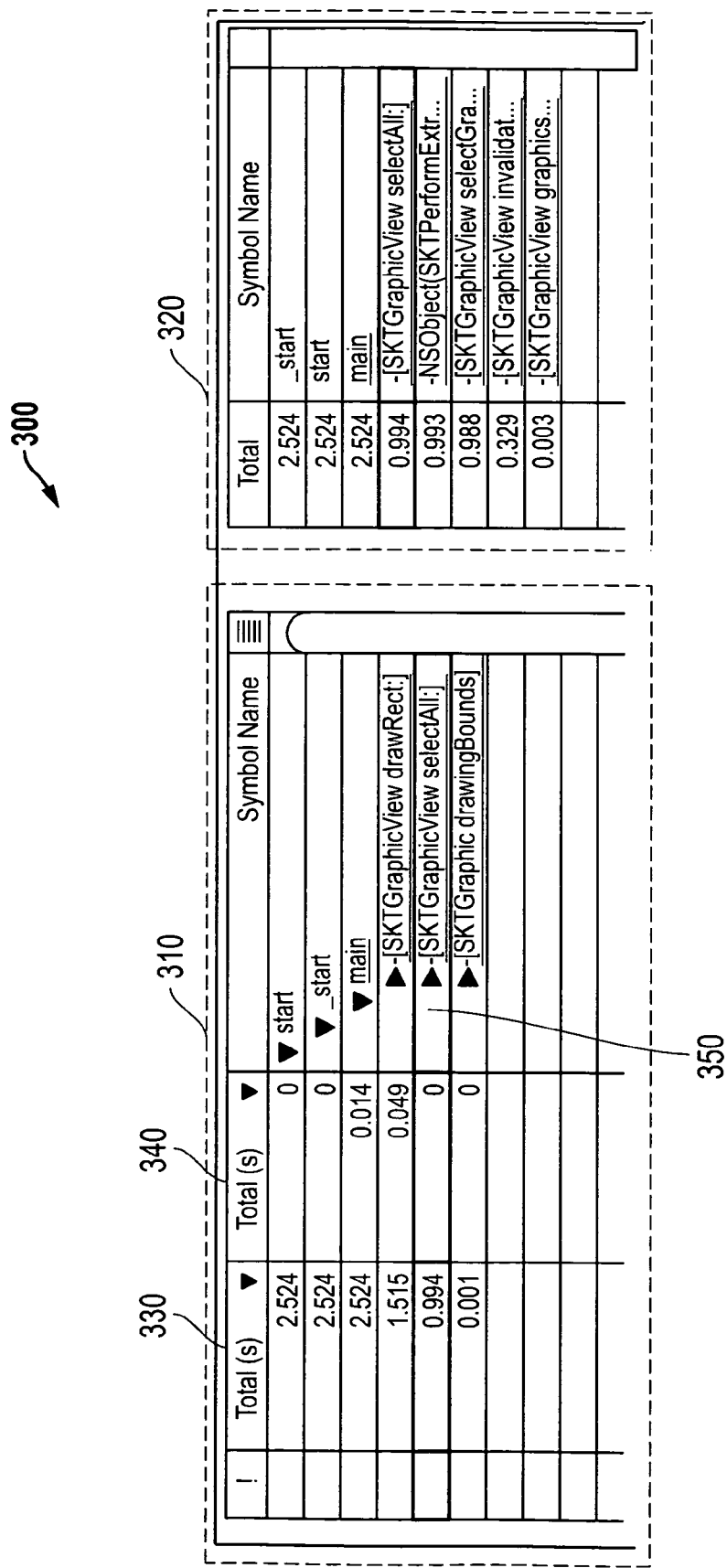
FIG. 3 depicts a portion of an exemplary callstack table (tree view).

FIG. 3 depicts a portion of an exemplary screenshot of a callstack table 300 comprising representations of a tree view of a call tree 310 and a callstack pane 320. The "Total" column 330 represents the amount of time spent in a function and its descendants. The "Self" column 340 represents the amount of time spent only inside the listed function.

Selecting, e.g., by double clicking, a function in the tree view may result in the display of a code browser. The code browser provides a more detailed analysis of the code. The code browser may show the source code. The code browser may also show the assembly code. The default view may be set to show source code. Multiple colors may be used to indicate activity within a function; for example, yellow may be used to indicate sample counts that occur within the function, and orange may be used to indicate sample counts (referred to as "deep counts") that occur in functions that are called by that function.

If, for example, the function "-[SKTGraphicView selectAll:]" 350 is selected, e.g., by double clicking, a code browser may be displayed, such as that depicted in FIG. 4. Likewise, selecting a particular line of code in the code browser may result in the display of the function called in that line of code. Color coding and shading may be used to provide visual indication of cost. For example, a color such as yellow may be used to highlight lines of code having costly operations, wherein the brightness or intensity of the color in the line of code may be proportional to the cost.

Figure 5:
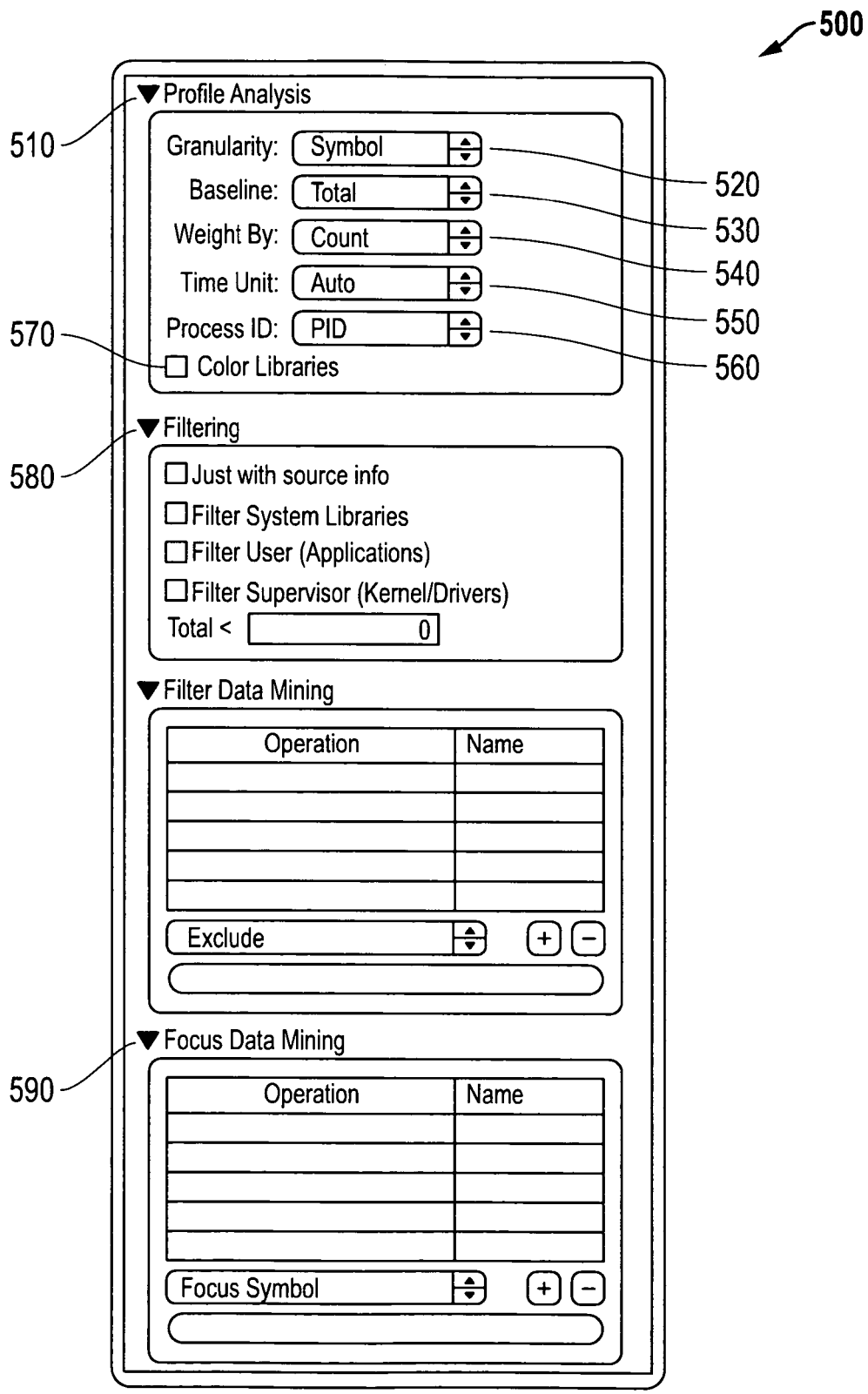
FIG. 5 depicts an exemplary user interface for callstack analysis and data mining.

Reference is now made to FIG. 5, which depicts an exemplary user interface 500 which provides controls for performing more efficient callstack analysis and data mining. In the Profile Analysis box 510 of the user interface 500, several items may be provided which can be configured according to the user's preference.

Samples may be grouped according to various categories. Granularity 520 determines at what level samples are combined. For example, samples from the same program address may be grouped together. Alternatively, samples may be combined according to symbol (function). Further still, samples from the same library may be combined.

By default, the baseline 530 for statistics may be the total number of displayed samples. Alternatively, the total number of samples in the current sampling session may be selected.

In addition to context and performance counter information, each sample may save the time interval since the last sample was recorded. The default "weight by" method 540 may be by sample count, wherein each sample contributes a reference count of one. During sample processing, when a sample lands in a particular symbol's address range (in the case of symbol granularity), the total reference count (or weight) of the granule is incremented by one. When samples are weighted by time, each granule may be weighted instead by the sum of the sampling interval times of all of its samples.

By default, the time unit 550 may be scaled as appropriate for the magnitude of the numbers involved. This preference allows the user to set a single time unit 550 to always be used automatically.

The process ID (PID) 560 is a unique integer assigned to each process running on the system. Samples from the same PID may be grouped together. Processes can also be identified by name, and samples from processes with the same name can be grouped together.

The Color Libraries option 570 may be switched on or off, depending on whether the user prefers to see the library names and symbols shown in different colors based on the library from which it came. Color coding the libraries provides for ease of quickly visually identifying groups of related functions.

Various data mining operations may be provided, in order to eliminate uninteresting information and focus on information of interest. The filter operations may include any of the following: Exclude Symbol (also referred to as simply Exclude), Exclude Library, Exclude System Library, Exclude No Source Info, Exclude User, Exclude Supervisor, Exclude Self, Exclude # Samples, Flatten Symbol, Flatten Library, Focus Symbol, Focus Library, Focus Callers of Symbol, and Focus Callers of Library.

The foregoing lists are illustrative lists of exclusion and filter operations. These lists and the accompanying parameters are provided for illustration and completeness of discussion only and not as limits on the inventive concept. Regarding the inventors' implementations of the aforementioned innovations, each of the listed operations may or may not be used or modified. Furthermore, additional operations may be created and those may differ materially from that disclosed.

The Exclude Symbol operation hides a particular symbol (function) and charges the cost of the function to its parent. The Exclude No Source Info operation hides all samples from addresses or symbols for which no source code information is available. Exclude Self hides any samples of the present analysis tool. Exclude # Samples hides all functions for which the aggregate sample count is below some threshold amount.

Exclude Supervisor hides all supervisor space samples (e.g., kernels and drivers). Exclude User hides all user space samples.

An extremely useful operation is Exclude Library. This operation hides all functions from a specified library and charges or propagates the costs of those functions to the functions calling into that library. Exclude System Library hides all function in core system libraries, to allow a developer to focus on application logic. For example, in the Mac OS X framework, the Exclude System Library operation would filter out all leaf function calls that occur in the Mac OS X System.framework, the Objective-C runtime (libobjc), the dynamic link library (libdyld), and the CoreFoundation and Foundation frameworks. The cost of the removed system library and framework calls would be applied to the application level functions or methods that are calling them.

In implementing the Exclude Library or Exclude System Library operations, a determination can be made if an address corresponding to a function falls within a particular range of values corresponding to the library desired to be excluded from view. A library can generally be considered as a collection of functions, and every function has an address range. If an address falls within the range corresponding to the excluded library, then it can be excluded from view.

It is noted that if an exclusion operation removes all the symbols from a particular sample, then that sample is removed from the set of samples shown. Its count effectively goes to zero.

Certain exclusion operations may automatically occur by default according to the situation. For example, when doing time-based profiling at the user level, every stack backtrace ending in any system or library calls that are known to be in "wait" states may be automatically filtered out. This leaves just the backtraces representing where actual CPU time is being spent. When analyzing memory allocations, the actual system allocation routines such as malloc( ) may be automatically filtered out in order to immediately see higher-level functions that are causing memory to be allocated. When analyzing file access patterns, system and library calls such as open( ) fopen( ) stat( ) and fstat( ) may be automatically filtered out in order to see higher-level functions that are causing files to be accessed. By presenting the higher-level functions as pivot points, the developer can see the function call tree to determine whether it was open( ) stat( ) or other functions being called.

Thus, the exclusion operations advantageously provide for the stripping out of uninteresting information and help identify where bottlenecks are in the middle part of the execution tree.

The Flatten Symbol and Flatten Library operations can both collapse (or "flatten") a chain of symbols. Flatten Library does this for every symbol in a specified library, while Flatten Symbol collapses chains that include the specified symbol. Thus, a whole sub-tree of calls can be replaced with a single symbol. Such operations are useful for hiding extraneous information without losing all of it.

Flatten Library can eliminate or collapse functions occurring within a library. For example, if a developer is writing an application that uses a core framework such as AppKit, the functions called by her application into AppKit are of greater interest to the developer, rather than functions occurring within AppKit. For instance, the developer's application may call "-[NSTableView reloadData]" to instruct the NSTableView that the data has changed and that it must reload the data. To reload the table data, it will typically query the table's data source for information about the table and make various internal calls in order to implement various tasks, e.g., autosize the columns, adjust the row heights, etc. These internal calls are implementation details of NSTableView that are not usually of interest to the developer. Hence, it is generally preferable is to treat functions such as "-[NSTableView reloadData]" as a "black box" that is called by the application and calls out to the application.

Flatten Symbol collapses chains of functions that include a given symbol. For example, consider the tree structure shown below in Table 1:

TABLE 1

| Count | Function |
|---|---|
| 5 | main |
| 5 | foo |
| 3 | bar |
| 1 |   bar |
| 1 |     bar |
| 1 |       bar |
| 1 |         mumble |
| 2 | bar |
| 1 |   bar |
| 1 |     mumble |
| 1 |     kah |
| 2 | bar |
| 1 |   mumble |
| 1 |   hehe |

The Flatten Symbol operation on the symbol "bar" would advantageously collapse repeated entries of "bar," such that the call tree would be condensed to a tree such as that shown below in Table 2:

TABLE 2

| Count | Function |
|---|---|
| 5 | main |
| 5 | foo |
| 5 | bar |
| 3 |   mumble |
| 1 |   kah |
| 1 |   hehe |

The Flatten operations are particularly useful for flattening recursive calls in order to facilitate understanding calling behavior.

Focus operations allow the user to look at just a specific portion of the call tree. For example, Focus Symbol shows a particular function and its descendants (i.e., the functions that are called during its invocation (i.e., the descendants of the focused function). The portions of the callstack that are callers of that function or callstacks that do not contain the specified function are removed from the outline. Thus, when focusing on a particular symbol, the specified symbol (function) and all functions called by that symbol are displayed.

For example, consider the following tree structure shown in Table 3:

TABLE 3

| a1 | libA |
|---|---|
|   b1 | libB |
|     b2 | libB |
|       b3 | libB |
|         c1 | libC |
|   b4 | libB |
|     b5 | libB |
|       d1 | libD |

For example, Focus Symbol on the Symbol "b2" would result in a significantly pruned call tree such as the call tree shown below in Table 4:

TABLE 4

| b2 | libB |
|---|---|
|   b3 | libB |
|     c1 | libC |

Figure 6:
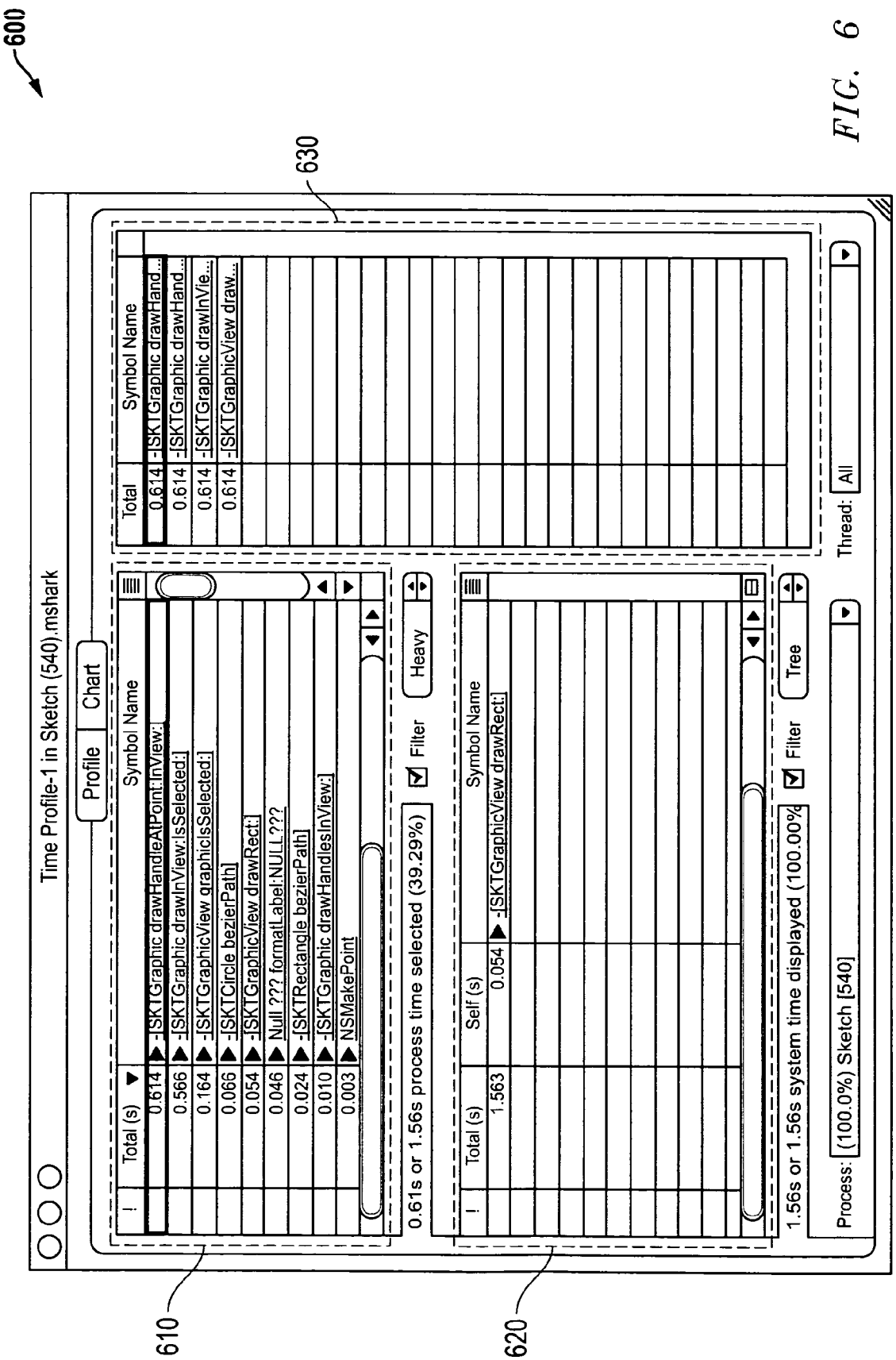
FIG. 6 depicts an exemplary callstack table for a time-based profile (tree view and heavy view).

As another example, referring back to FIG. 3, if the operation Focus Symbol on "-[SKTGraphicView drawRect:]" is performed, the result may be the display of a dual-tree view such as the profile view 600 shown in FIG. 6, which includes both a bottom-up call tree (heavy view) 610 and a top-down call tree (tree view) 620, as well as a callstack pane 630. The heavy view is now rooted on the symbol that is being focused on, and the items in the tree view reflect only the leaf times relative to the execution tree under this new root. In the heavy view, it appears that the most time is spent in "-[SKTGraphic drawHandleAtPoint:inView]."

Advantageously, when focusing on a specific function, two call trees can be displayed concurrently: (1) the inverted (bottom-up) call tree showing all paths leading from the focused function to each of the leaf functions under it; and (2) the non-inverted (top-down) call tree showing all paths from the focused function to all leaf functions called by it. The cost of a function can be charged to the parent function, in either the top-down or the bottom-up tree. The cost of the pivot point function can be better appreciated when the two views are presented concurrently. By viewing both trees, one can more readily ascertain the commonality as well as the differences. The top down tree gives context and the bottom up tree indicates hot spots.

The Focus Library operation is similar to the Focus Symbol operation, but it is applied to each function in a particular library. When focusing on a specified library, all of that library's functions and all functions called by the library's functions are displayed. For example, Focus Library on libB in the call tree of Table 3 would result in a pruned call tree such as the call tree shown below in Table 5:

TABLE 5

| b1 | libB |
|---|---|
|   b2 | libB |
|     b3 | libB |
|       c1 | libC |
| b4 | libB |
|   b5 | libB |
|     d1 | libD |

The Focus Callers of Symbol operation is best understood as the inverse of the Focus on Symbol operation. It removes all functions called by a particular function, leaving only the chains between main and the function of interest. It also removes all callstacks that do not contain the specified function from the outline. For example, Focus Callers of Symbol on b2 in the call tree of Table 3 would result in a pruned call tree such as the call tree shown below in Table 6:

TABLE 6

| a1 | libA |
|---|---|
|   b1 | libB |
|     b2 | libB |

The Focus Callers of Library operation is similar to Focus Callers of Symbol, but it is applied to every symbol in a particular library. For example, Focus Callers of Library on libB in the call tree of Table 3 would result in a pruned call tree such as the call tree shown below in Table 7:

TABLE 7

| | |
|---|---|
| a1 | libA |
| b1 | libB |
| b2 | libB |
| b3 | libB |
| b4 | libB |
| b5 | libB |

Thus, data from a large number of samples can be pruned using exclusion and focus operations. In accordance with the principles of the present invention, sampling need not be limited to time-based sampling; rather, as mentioned above, other types of sampling may be used. Software programs can have poor performance due to any of a number of different problems, including but not limited to the following: bad algorithms, excessive memory allocation, excessive locking, disk I/O, network calls, inter-process communication (IPC), and executing the same operation more than once. Accordingly, sampling may be configured based on any of a variety of triggers that may be of interest.

For example, sampling may be triggered based on occurrence of one or more specific events. A specified hardware or OS event such as a crash, page fault, cache miss, instruction stall, or other event of interest may be used to trigger sampling. A list of such events may be advantageously suggested via a user interface to assist the developer in selecting the sampling configuration.

In addition, CPU performance counters can be used to trigger sampling. Memory controller performance counters can also be used to trigger samples. Processor interface bus counters may also be used to trigger samples. OS performance counters pertaining to virtual memory (e.g., page faults, zero-fill faults, and copy-on-write faults, etc.), system calls, scheduler (e.g., context switches, handoffs, etc.), disk I/O (e.g., synchronous, asynchronous, reads, writes, meta data, etc.), and PPC exceptions (e.g., DSI, ISI, etc.) may also be used to trigger events.

Sampling may also be triggered based on the occurrence of a particular function call. A menu of particular functions may be advantageously suggested via a user interface to assist the developer in selecting the sampling configuration.

For example, sampling may be performed based on the occurrence of each file I/O or file system access call (e.g., access, close, creat, lseek, mkdir, open, read, ready, rename, rmdir, truncate, unlink, write, writev, getattrlist, setattrlist, getdirentries, getdirentriesattr, etc.) within the sampling period.

Sampling may also be performed based on the occurrence of each inter-process communication (e.g., mach_msg_overwrite_trap, mach_msg_overwrite, etc.) within the sampling period.

Sampling may also be performed based on the occurrence of system calls (e.g., access, close, creat, fcntl, flock, fstat, fsync, link, lseek, _lstat, lstat, lstatv, mkdir, open, read, ready, rename, rmdir, stat, truncate, unlink, write, writev, getattrlist, setattrlist, getdirentries, getdirentriesattr, etc.) within the sampling period.

Sampling may also be performed based on the occurrence of mem copy functions (e.g., memchr, memcmp, memcpy, memmove, memset, strcat, strcmp, strcpy, strcspn, strncat, strncpy, bcmp, bcopy, bzero, ffs, memccpy, strdup, strlcat, strlcpy, etc.) within the sampling period.

Sampling may also be performed based on the occurrence of locking (e.g., pthread_mutex_lock, pthread_mutex_trylock, semaphore_wait, semaphore_timedwait, semaphore_wait_signal, semaphore_timedwait_signal, IOTrySpinLock, etc.) within the sampling period.

Sampling may also be performed based on the occurrence of a cross-library call, i.e., a function from one library calling to a function in another library. Large, complex software can often contain a large number of libraries, and each library contains various functions. Sampling based on cross-library calls is believed to provide a representative sampling of the overall execution pattern of a program.

Furthermore, sampling may be based on any desired function call (e.g., memchr, memcmp, memcpy, memmove, memset, strcat, strchr, strcmp, strcoll, strcpy, strcspn, strerror, strlen, strncat, strncmp, strncpy, strpbrk, strrchr, strspn, strstr, strtok, strxfrm, bcmp, bcopy, bzero, ffs, index, memccpy, rindex, strcasccmp, strdup, strlcat, strlcpy, strmode, strncasecmp, strsep, swab, etc.) within the sampling period.

In addition, a system trace may also be taken in order to help understand scheduling behavior. A Java trace may also be taken in order to provide time/allocation tracing in Java.

The foregoing lists are illustrative lists of some of the categories of events and functions which may trigger sampling. These lists and the accompanying parameters are provided for illustration and completeness of discussion only and not as limits on the inventive concepts. Regarding the inventors' implementations of the aforementioned innovations, each of the listed operations may or may not be used or modified. Furthermore, additional operations may be created and those may differ materially from that disclosed.

Figure 7:
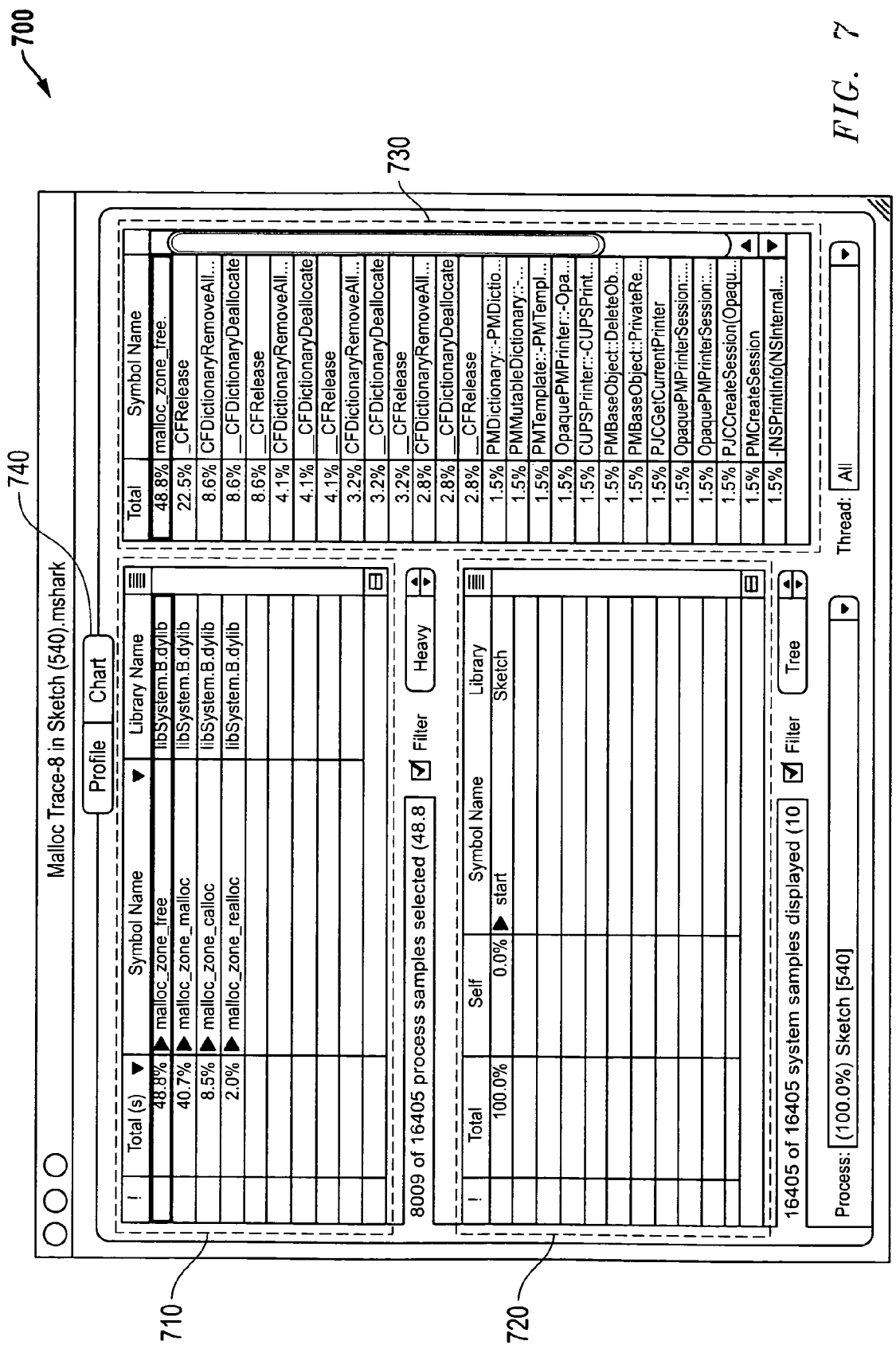
FIG. 7 depicts an exemplary callstack table for a malloc-based profile (tree view and heavy view).

In accordance with certain embodiments of the present invention, sampling may occur based on the occurrence of a memory allocation (malloc) call. This sampling technique is also referred to as heap tracing. FIG. 7 depicts an exemplary profile 700, which was based on a malloc trace. Malloc calls are believed to be generally representative of the overall execution pattern of a program.

The display advantageously includes both a heavy view 710 and a tree view 720, and a callstack pane 730. The heavy view 710 is represented by a tabular summary of the total malloc counts (which is expressed in this example as a percentage), the function name (Symbol Name), and the name of the library to which the function belongs (Library Name). The heavy view is a bottom-up call tree showing all paths leading from the memory allocation functions to the application's top-level main function (or to the focused function if focusing is enabled). The tree view 720 shows a top-down call tree showing all paths from the main function (or focused function if focusing is enabled) to the memory allocation functions. The stack view shows the heaviest path from main to (in this example, "malloc_zone_free"). The stack view changes based on user selection of a function in the heavy or tree view.

Figure 8:
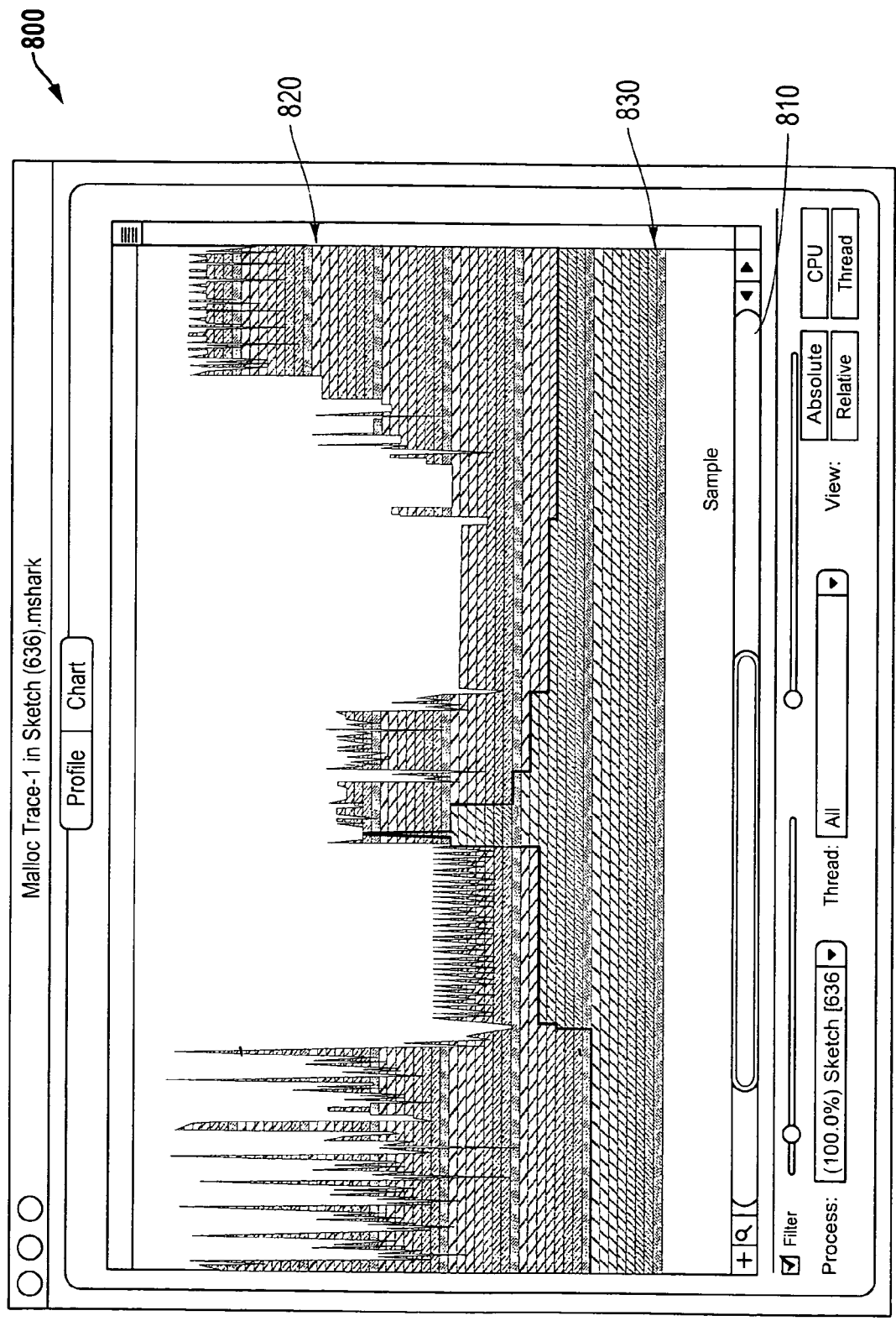
FIG. 8 depicts an exemplary chart of callstack depth versus sample count.

Selecting button 740 results in the display of a graphical "Chart" view, which reveals a software fingerprint of the execution paths. An exemplary chart view is depicted in FIG. 8. In accordance with various embodiments of the present invention and as shown in FIG. 8, a chart of the callstack depth (i.e., the number of functions in the callstack) versus the sample number (i.e., the nth time that a sample was taken) is depicted. The callstack depth may alternatively be plotted versus time, such as in cases of time-based sampling. In order to view a very large number of samples, a scrollbar or other suitable feature 810 may be provided to allow scrolling along the sample (or time) axis.

In accordance with various embodiments of the present invention, the graphical "Chart" view allows sample data to be viewed and explored chronologically. This view advantageously helps in the understanding of the chronological calling behavior in a program, as opposed to the summary calling behavior shown in the tabular "Profile" view.

Color coding may be provided in order to further allow ease of quickly understanding the graphical view. For example, user callstack entries may be shown in one color, while supervisor callstacks may be shown in a different color. The currently selected callstack may be shown in yet another color. For example, as implemented in FIG. 8, the user callstack entries (820) may be colored in blue, while the supervisor callstack entries (none shown) may be colored in red, while a selected callstack (830) may be colored in yellow.

The currently selected callstack may be established by, for example, selecting a location in the chart. Cursor keys can be used to navigate to the previous or next unique callstack. Each callstack may be displayed as a pyramid-like arrangement, with the oldest caller's tenure at its base. Function tenure is the length of time that a particular function is in the callstack. As shown in the example in FIG. 9, stack frame 0 (910) is main and is active the entire time. The tenures get narrower as the stack gets deeper. Tall, narrow spikes of the selected function callstack indicate deep chains of calls that do little work and should generally be avoided.

Leaf data is represented in the graph by the top-most point of each sample. Unlike in the prior art, the depth (representing non-leaf call stack information) of the call stack to reach the leaf is graphically presented.

In addition, color gradients may be used in the chart view. Color gradients may advantageously provide a quick visual indication of callstack depths. For example, for every n units of callstack depth, the intensity of color may gradually increase (or decrease). In the example shown in FIGS. 8-9, the intensity of color gradually decreases every eight functions in the callstack depth.

Figure 9:
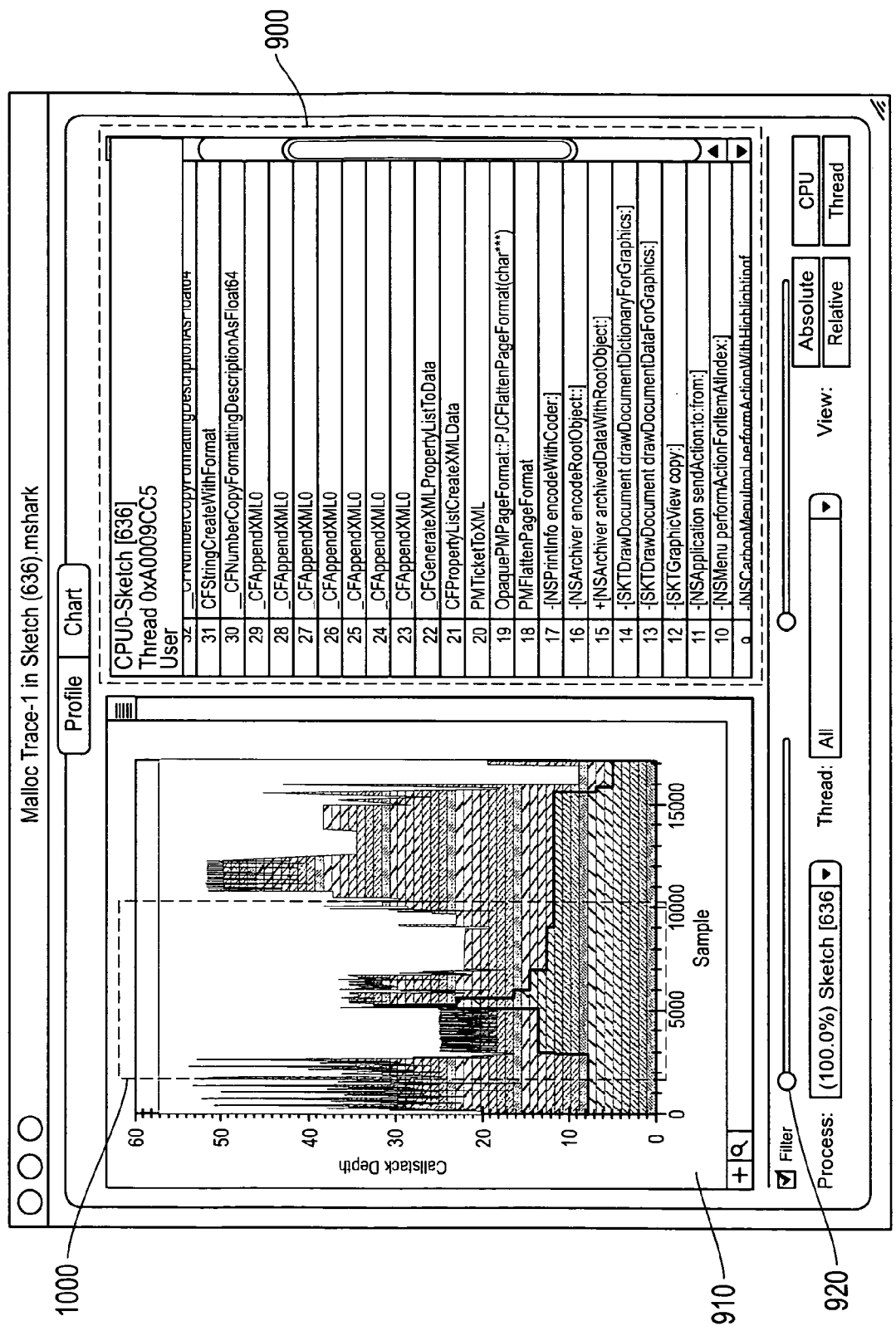
FIG. 9 depicts an exemplary chart of callstack depth versus sample count, together with a callstack table.
Figure 10:
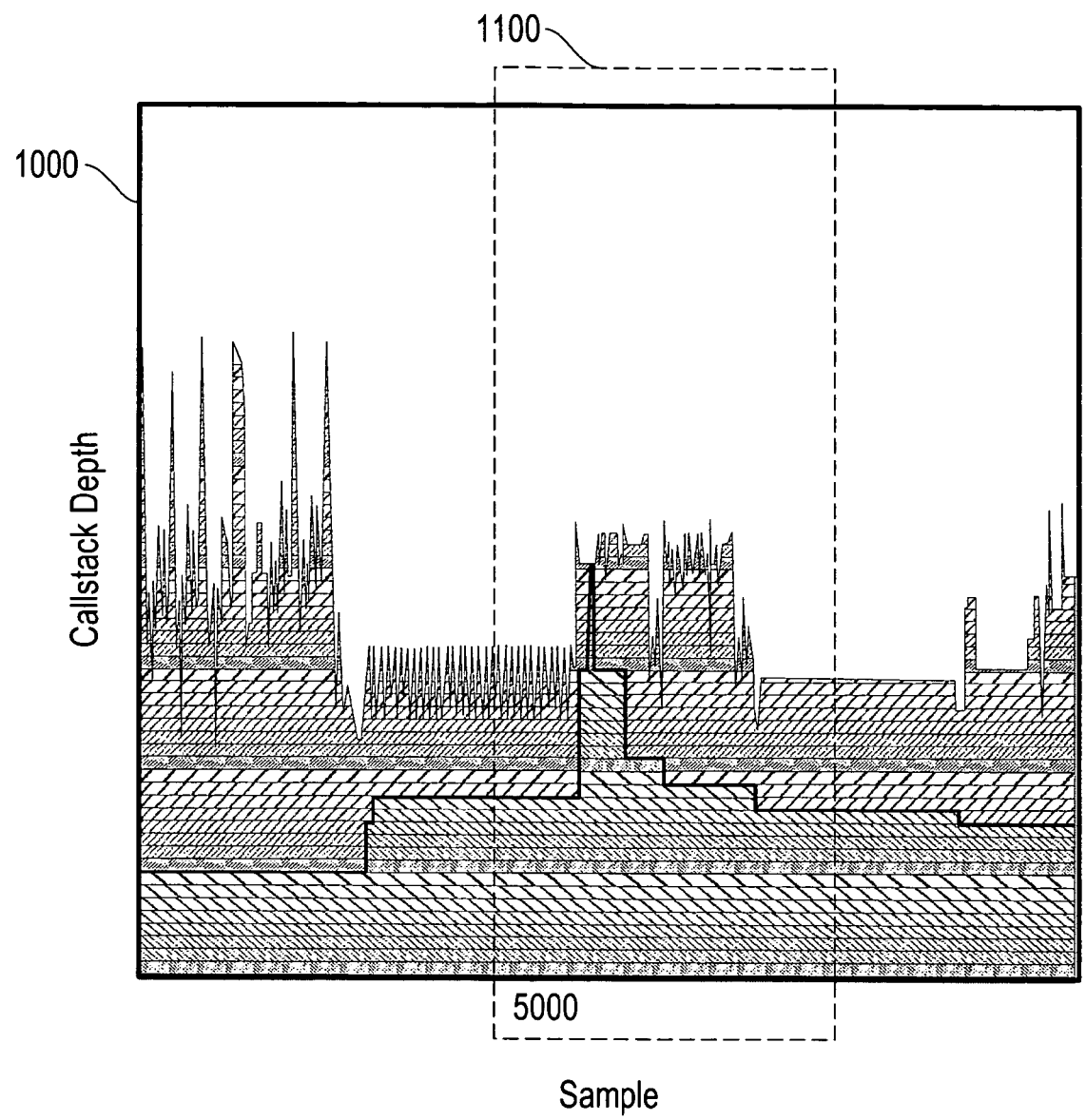
FIGS. 10-13 depict enlarged views of portions of the chart of FIGS. 8 and 9.
Figure 11:
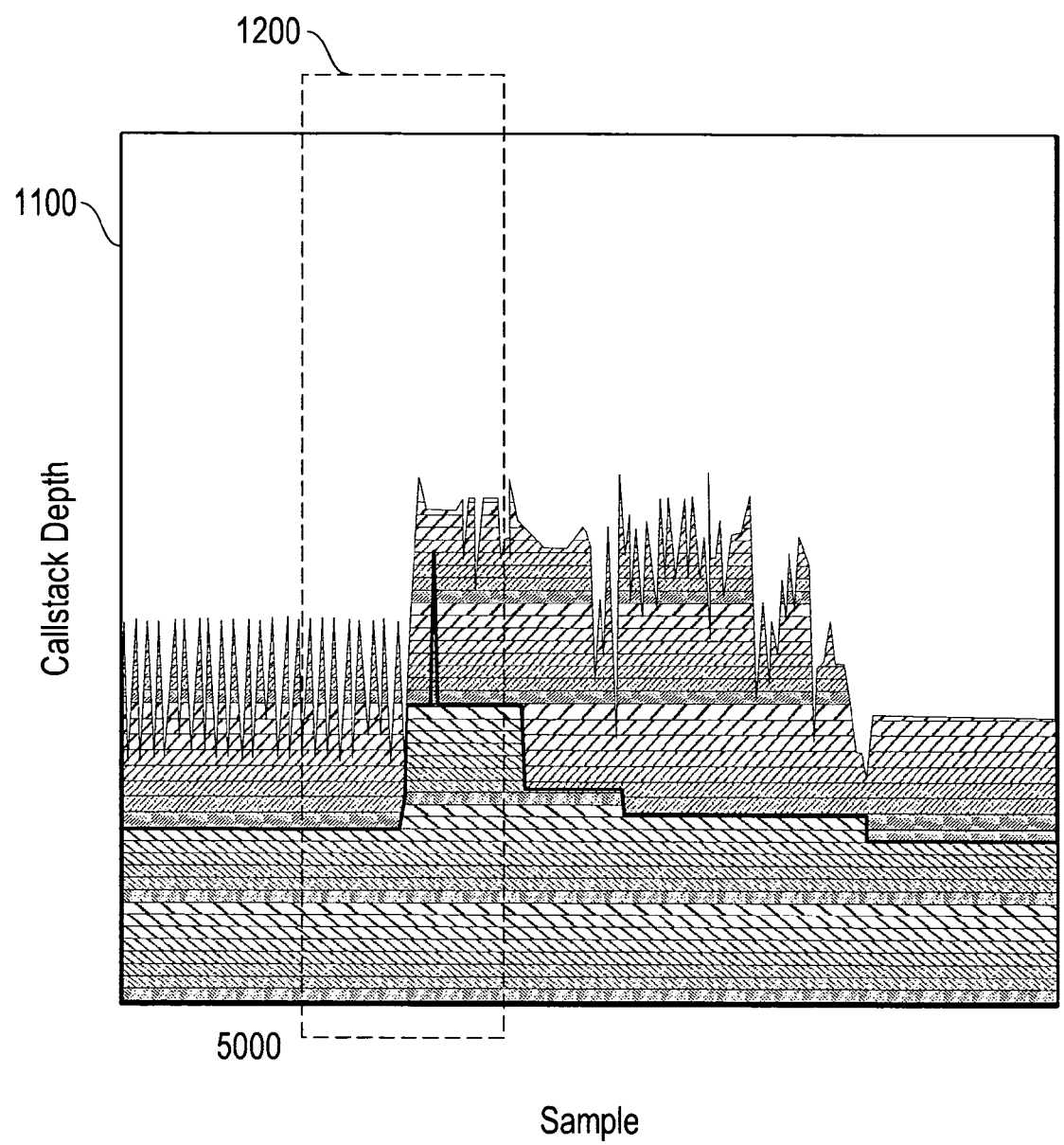
Figure 12:
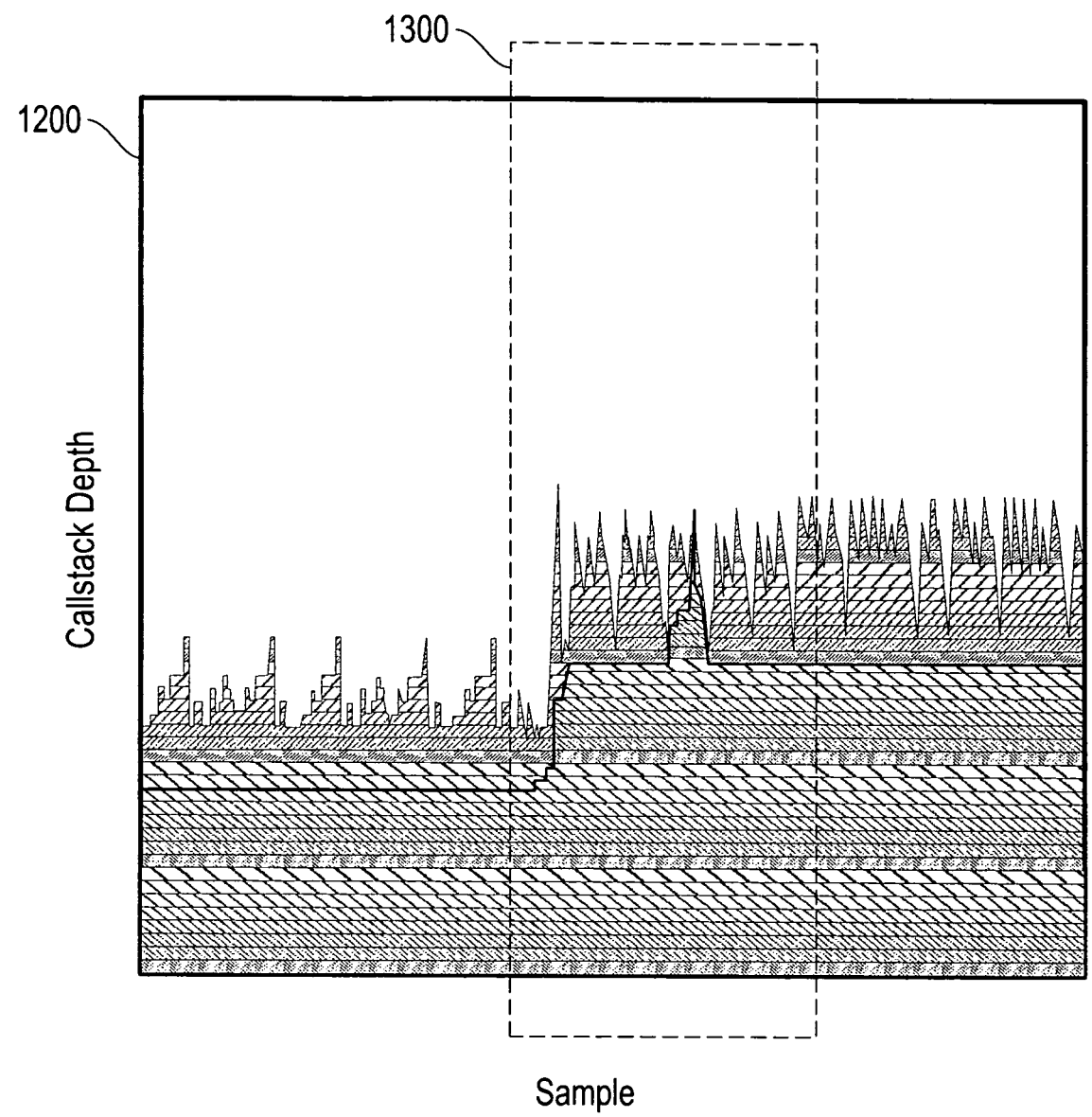
Figure 13:
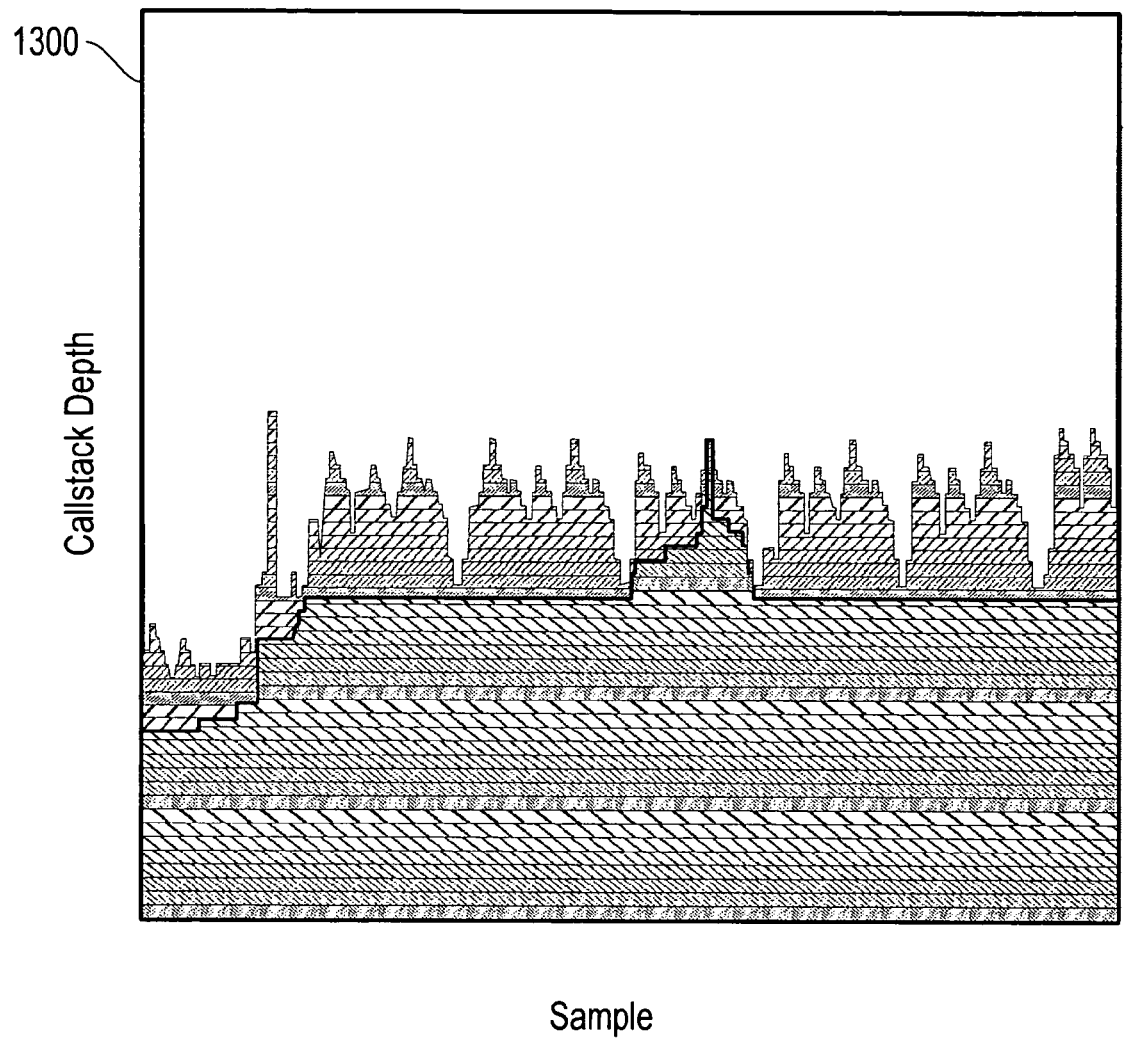

The currently selected callstack entries may be displayed in a Callstack Table, such as the callstack table 900 shown in FIG. 9. By examining the functions in the callstack, problems such as cross-library problems may become apparent. Upon selecting a particular function in the callstack table 900, a code browser window may be displayed. The code browser may show the source code corresponding to the selected function. The code browser may also show the assembly code corresponding to the selected function.

A control 920 may be provided to adjust the zoom level of the sample axis, or the callstack depth axis, or both, of the chart view. In addition, a portion of the chart may be selected and enlarged in order to reveal greater detail. FIGS. 10 through 13 depict portions of the chart of FIG. 9 at varying levels of magnification. Magnifying the chart reveals multiple levels of complexity, much like a fractal.

Exploring around the execution trace and identifying ranges of repeated structure aids in understanding the code's execution. The reason for the fractal-like quality is the many layers and libraries that encapsulate one another. Each of these layers can introduce levels of iteration nested inside of other layers. The problem of complexity creep can be eliminated in order to drastically improve performance. Developers of large scale applications may not be able to fix framework issues, but they can strive to eliminate similar complexity issues in their libraries. Framework writers can use this analysis to improve frameworks, and so on.

Thus, in accordance with the present invention, the graphical chart view is advantageously provided for helping to quickly identify repeated execution paths in the code due to the fact that execution trees leave a form of "fingerprint." It is very unlikely that two different code paths will show the same graphical pattern. Thus, when identical graphical patterns appear in the graph, it indicates that the same path through the code was likely being executed. When two graphical patterns are very similar, very similar paths through the code (with different conditional evaluations) were likely taken. Thus, patterns represent specific call patterns through the code. Such patterns may be automatically identified, and optimization advice may be automatically provided with respect to improving performance.

As one of ordinary skill in the art would understand, computer software is often stored on computer storage devices (sometimes referred to as computer-readable media). Computer storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Figure 14:
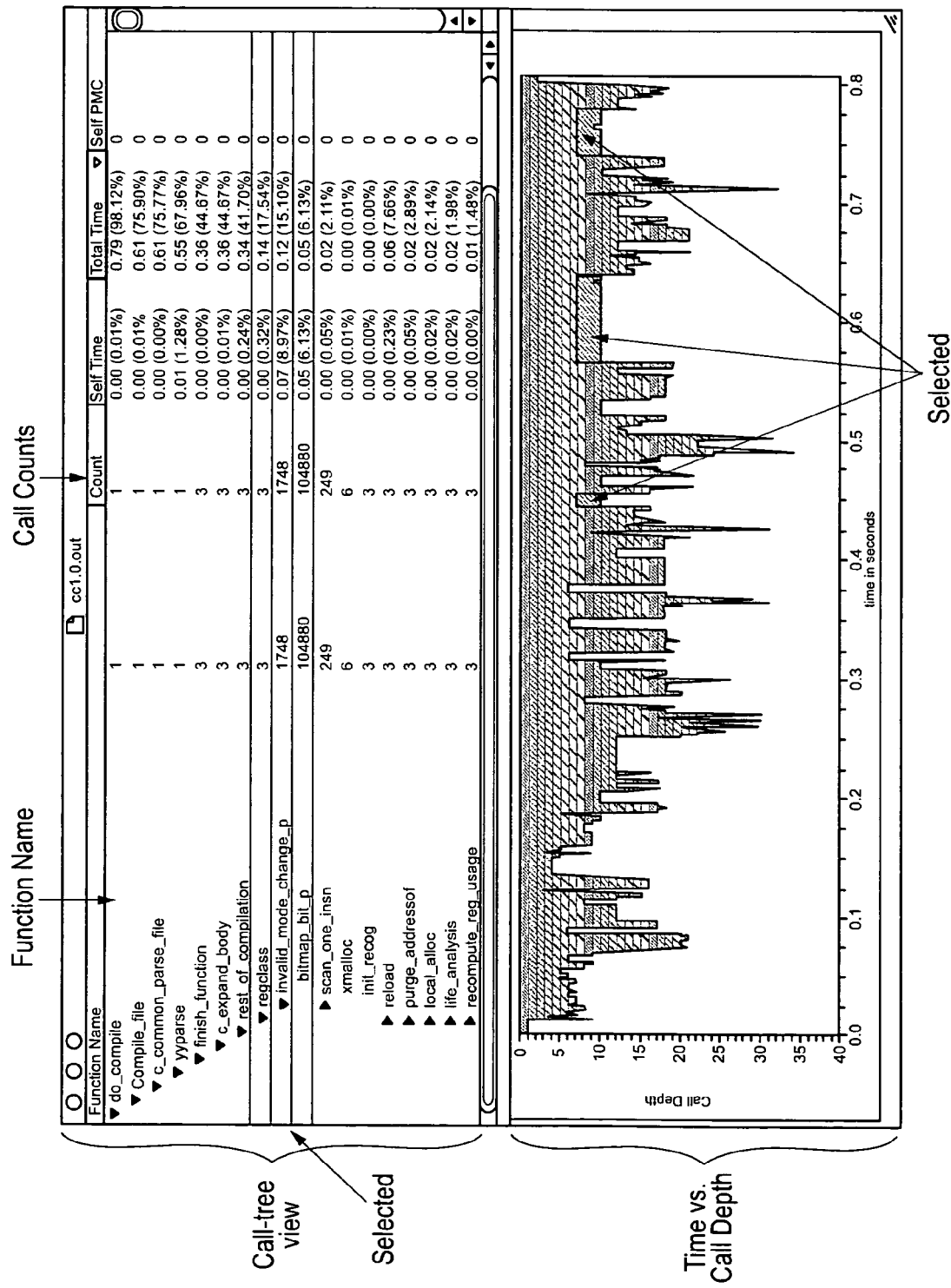
FIG. 14 depicts an exemplary view comprising a chart of callstack depth versus time, together with a call-tree view.

Reference is now made to FIG. 14, which depicts an example of a display of a chart of callstack depth versus time, as well as a call-tree. When one or more functions are selected in the call-tree view, the portion(s) of the chart corresponding to the selected function(s) may be highlighted, for example, in a different color. As shown in the example in FIG. 14, the functions "regclass," "invalid_mode_change_p," and "bitmap_bit_p" have been selected in the call-tree view. Accordingly, the areas of the chart that correspond to the selected functions are highlighted in a different color, e.g., orange, for facilitating understanding of the code execution.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

We claim:

1. A method for graphically presenting information pertaining to function calls during execution of a process on a computer system, the method comprising the steps of:
    obtaining a plurality of call stack samples,
        wherein the samples are based on occurrence of a specific event, and
        wherein the event is selected from the group consisting of: a cache miss, an execution stall, an operating system event, and a call to at least one specific function from a list of automatically suggested functions;
    displaying, for at least a portion of the samples, a chart of call stack depth versus sample number;
    highlighting a portion of the display in response to selection of a location in the chart or selection of a function; and
    displaying a list of functions associated with the highlighted portion of the display.

2. The method as claimed in claim 1, wherein the event is selected from a list of automatically suggested events.

3. The method as claimed in claim 1, wherein the specific function comprises a memory allocation.

4. The method as claimed in claim 1, wherein the specific function comprises a file system access.

5. The method as claimed in claim 1, wherein the specific function comprises a mem copy function.

6. The method as claimed in claim 1, wherein the specific function comprises a cross-library function.

7. The method as claimed in claim 1, wherein the specific function comprises an inter-process communication.

8. The method as claimed in claim 1, wherein the specific function comprises a semaphore lock.

9. The method as claimed in claim 1, wherein the operating system event comprises a page fault.

10. The method as claimed in claim 1, further comprising the step of:
automatically identifying a function-call pattern indicative of non-optimal performance of the process.

11. The method as claimed in claim 10, wherein the function-call pattern comprises at least two substantially similar structures.

12. The method as claimed in claim 10, wherein the function-call pattern indicates multiple redundant function calls.

13. The method as claimed in claim 10, wherein the function-call pattern indicates an inefficient sequence of function calls.

14. The method as claimed in claim 10, wherein the function-call pattern indicates an unnecessarily deep sequence of function calls of brief tenure.

15. The method as claimed in claim 1, further comprising the step of:
in response to selection of a particular function, highlighting a portion of the chart to indicate tenure of the particular function.

16. The method as claimed in claim 1, further comprising the step of:
in response to selection of a location in the chart, highlighting a portion of the chart representative of a call stack associated with the selected location.

17. The method as claimed in claim 16, further comprising the step of:
indicating tenure of each function in the call stack associated with the selected location.

18. The method as claimed in claim 17, further comprising the step of:
displaying the tenure of each function in a first color.

19. The method as claimed in claim 16, further comprising the step of:
displaying a list of functions in the call stack associated with the selected location.

20. A method for analyzing code execution, the method comprising the steps of:
obtaining a plurality of samples, wherein each of the samples includes a function call stack associated with occurrence of a specific event during code execution;
displaying, for at least a portion of the samples, a chart of call stack depth versus sample number;
highlighting a call stack in response to selection of a location in the chart;
indicating tenure of each function in the highlighted call stack; and
displaying a list of functions in the highlighted call stack.

21. The method as claimed in claim 20, wherein the event is selected from a list of suggested events.

22. The method as claimed in claim 20, wherein the event is selected from the group consisting of: a cache miss, an execution stall, an operating system event, passing of a time interval, and a call to a specific function.

23. The method as claimed in claim 22, wherein the specific function is selected from a list of suggested functions.

24. The method as claimed in claim 20, wherein the event comprises a memory allocation call.

25. The method as claimed in claim 20, wherein the event comprises a cross-library call.

26. The method as claimed in claim 20, wherein the event comprises a page fault.

27. The method as claimed in claim 20, wherein the event comprises a file system access.

28. The method as claimed in claim 20, wherein the event comprises an inter-process communication.

29. The method as claimed in claim 20, wherein the event comprises a mem copy function call.

30. The method as claimed in claim 20, wherein the event comprises a semaphore lock.

31. The method as claimed in claim 20, wherein the event comprises a CPU cycle.

32. The method as claimed in claim 20, further comprising the step of:
automatically identifying a function-call pattern indicative of non-optimal performance.

33. The method as claimed in claim 32, wherein the function-call pattern comprises at least two substantially similar structures.

34. The method as claimed in claim 32, wherein the function-call pattern indicates multiple redundant function calls.

35. The method as claimed in claim 32, wherein the function-call pattern indicates an inefficient sequence of function calls.

36. The method as claimed in claim 32, wherein the function-call pattern indicates an unnecessarily deep sequence of function calls of brief tenure.

37. A computer-readable storage medium having computer-executable instructions tangibly embodied thereon wherein the executable program a processor to perform the method recited in any one of claim 1, or 20.

38. A program storage device, readable by a programmable control device, comprising machine-readable instructions stored thereon for causing the programmable control device to:
obtain a plurality of call stack samples,
wherein the samples are based on occurrence of a specific event, and
wherein the event is selected from the group consisting of: a cache miss, an execution stall, an operating system event, and a call to at least one specific function from a list of automatically suggested functions;
display, for at least a portion of the samples a chart of call stack depth versus sample number;
highlight a portion of the display in response to selection of a location in the chart or selection of a function; and
display a list of functions associated with the highlighted portion of the display.

39. A system for graphically presenting information pertaining to function calls during execution of one or more processes on the system, the system comprising:
a CPU (Central Processing Unit);
a memory operatively coupled to the CPU wherein the CPU is programmed to perform method in accordance with any of claim 1, or 20.

* * * * *

UNITED STATES PATENT AND TRADEMARK OFFICE
CERTIFICATE OF CORRECTION

| | | |
|---|---|---|
| PATENT NO. | : 7,730,460 B1 | Page 1 of 1 |
| APPLICATION NO. | : 10/871487 | |
| DATED | : June 1, 2010 | |
| INVENTOR(S) | : Christina E. Warren et al. | |

It is certified that error appears in the above-identified patent and that said Letters Patent is hereby corrected as shown below:

In column 2, line 37, delete "calls be" and insert -- calls can be --, therefor.

In column 3, line 64, delete "view" and insert -- view, --, therefor.

In column 3, line 64, delete "FIG. 1" and insert -- FIG. 1, --, therefor.

In column 6, line 40, delete "open( ) fopen( ) stat( )" and insert -- open( ), fopen( ), stat( ), --, therefor.

In column 6, line 44, delete "open( ) stat( )" and insert -- open( ), stat( ), --, therefor.

In column 10, line 17, delete "strxform," and insert -- strxfrm, --, therefor.

In column 10, line 18, delete "rindex" and insert -- rindex, --, therefor.

Signed and Sealed this
Eighth Day of November, 2011

David J. Kappos
*Director of the United States Patent and Trademark Office*